3,076,011
PHOSPHORUS CONTAINING MONOMERS
Charles L. Hamermesh, Canoga Park, Calif., and Norman G. Gaylord, New Providence, N.J., assignors to Interchemical Corporation, New York, N.Y., a corporation of Ohio
No Drawing. Filed Apr. 8, 1960, Ser. No. 20,818
5 Claims. (Cl. 260—461)

This invention relates to novel phosphorus containing monomers which are used in the preparation of resins utilized in coating compositions for metal surfaces.

It has been found that the presence of phosphorus in resins improves the adhesion of coatings containing these resins to metal surfaces. The novel phosphorus containing monomers of this invention when incorporated into resins by polymerization provide such phosphorus containing resins.

The phosphorus containing monomers of this invention have the formula

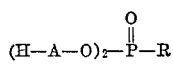

where A is a member selected from the group consisting of $(OCH_2CH_2)_n$ where $n$ is a number from 1 to 45, $-OC_6H_4-$, and $-OC_6H_4C(CH_3)_2--C_6H_4-$ and R is either $C_6H_5$ or $C_6H_5O$. They are prepared by the condensation of either phenyl phosphorus oxydichloride or phenoxyphosphorus oxydichloride with a diol, particularly Bisphenol A which is p,p'-isopropylidenediphenol, hydroquinone as well as ethylene glycol and polymers thereof. Chlorine determinations made on the novel monomers disclose chlorine percentages of .20% to .40% which indicates a substantially complete replacement of the 2 chlorine atoms by 2 (H—A—O) radicals.

Phosphorus containing ethoxylin resins may be prepared from the monomers of this invention by reacting said monomers with epichlorohydrin following a procedure similar to that described in U.S. Patent No. 2,512,996. The phosphorus containing ethyoxylin resins thus formed may be further reacted with fatty acids such as dehydrated castor oil fatty acid to produce phosphorus containing resinous esters and these resinous esters may be further reacted with ethylenically unsaturated compounds such as methyl methacrylate to produce modified resinous esters.

Bisphenol A is the preferred diol for best results.

While the proportions of the reactants used in preparing the novel monomers of this invention are not critical for the most desirable results, 2 moles of diol are preferably reacted with each mole of oxydichloride.

The monomers are prepared by a condensation reaction involving the heating of a mixture of the reactants and removing the water of condensation. Where Bisphenol A is one of the reactants, it is preferred to add the oxydichloride dropwise.

The following examples will illustrate the practice of this invention:

Example 1

| | G |
|---|---|
| (A) Phenyl phosphorus oxydichloride | 196 |
| (B) Bisphenol A | 456 |

B is melted by heating to 161° C. in a receptacle equipped with a condenser. A is added dropwise under continual stirring over a period of one hour, the temperature being maintained at 161° C. The mixture is then maintained at 160° C. for 5 hours under continual stirring. The product is then cooled and cast.

Example 2
The procedure of Example 1 is repeated using the following ingredients:

| | G |
|---|---|
| (A) Phenoxyphosphorus oxydichloride | 307 |
| (B) Bisphenol A | 660 |

Example 3
The procedure of Example 1 is repeated using the following ingredients:

| | G |
|---|---|
| (A) Phenyl phosphorus oxydichloride | 65 |
| (B) Bisphenol A | 76 |

Example 4
The procedure of Example 1 is repeated using the following ingredients:

| | G |
|---|---|
| (A) Phenoxyphosphorus oxydichloride | 71 |
| (B) Bisphenol A | 76 |

Example 5

| | G |
|---|---|
| (A) Phenyl phosphorus oxydichloride | 196 |
| (B) Hydroquinone | 220 |

A and B are mixed and heated to 150°–160° C. and maintained at this temperature for 6 to 7 hours. The product is then cooled and cast.

Example 6

| | G |
|---|---|
| (A) Phenoxyphosphorus oxydichloride | 212 |
| (B) Ethylene glycol | 62 |

To B maintained at 160° C., A is added dropwise with continuous stirring over a period of one hour. The mixture is then heated over a nine hour period, the temperature being slowly raised to 185° C.

Example 7

| | G |
|---|---|
| (A) Phenyl phosphorus oxydichloride | 196 |
| (B) Ethylene glycol | 62 |

To B at 25° C., A is added dropwise over the period of 1 hour with continuous stirring while the temperature is slowly raised to 100° C. The temperature of the mixture is then raised to and maintained at 155° C. for eight hours.

Example 8

| | G |
|---|---|
| (A) Phenoxyphosphorus oxydichloride | 87 |
| (B) Polyethylene glycol having a mol. wt. of 1500 | 225 |

To B maintained at 40°–60° C., A is added dropwise over a period of 1 hour with continuous stirring. The mixture is then maintained at 155°–170° C. for 4 hours.

Example 9
The procedure of Example 8 is repeated with the following ingredients:

| | G |
|---|---|
| (A) Phenyl phosphorus oxydichloride | 24 |
| (B) Polyethylene glycol having a mol. wt. of 1000 | 125 |

Example 10
The procedure of Example 8 is repeated using the following ingredients:

| | G |
|---|---|
| (A) Phenyl phosphorus oxydichloride | 49 |
| (B) Polyethylene glycol having a mol. wt. of 400 | 100 |

Example 11
(A) The product of Example 1, 550 g.
(B) 57 g. of NaOH in 494 g. of $H_2O$.

(C) Epichlorohydrin, 184 g.
(D) 22.8 g. of NaOH in 57 g. of H₂O.
(E) 8.3 g. of NaOH in 29 g. of H₂O.

A is dissolved in B resulting in a violent reaction. After the reaction subsides, C is added. The mixture is heated to 72° C. and D is added. After 30 minutes, E is added. The upper aqueous layer is decanted and the product is washed with water until the washings are neutral.

Example 12

The procedure of Example 11 is repeated using the same ingredients and proportions except that the product of Example 2 is used in place of the product of Example 1.

Example 13

The procedure of Example 11 is repeated using the following ingredients:

(A) The product of Example 5, 858 g.
(B) 142 g. NaOH in 956 g. of H₂O.
(C) Epichlorohydrin, 462.5 g.
(D) 57 g. NaOH in 145 g. of H₂O.
(E) 20 g. NaOH in 70 g. of H₂O.

Example 14

(A) Product of Example 11, 120 g.
(B) Dehydrated Castor Oil, 80 g.
    Fatty Acid.
(C) Xylene, 8 g.

A, B, and C are mixed and heated to 230° C. and maintained at said temperature until an acid value below 5 is reached.

Example 15

Example 14 is repeated using the same ingredients except that the product of Example 12 is used in place of the product of Example 11.

Example 16

The product of Example 15, 100 g. of methyl methacrylate and 66.6 g. of xylene are heated to 120° C. and 1 g. of tertiary butyl perbenzoate is added. The temperature is raised to and maintained at 130° C. for 2 hours at which time, another 1 g. of tertiary butyl perbenzoate is added and the heating at 130° C. is continued for 1 hour.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit of this invention.

What is claimed is:

1. Compounds having the formula

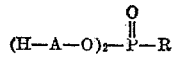

where A is a member selected from the group consisting of —OC₆H₄—, and —O—C₆H₄—C(CH₃)₂—C₆H₄—, and where R is a member selected from the group consisting of C₆H₅— and C₆H₅O—.

2. A compound having the formula

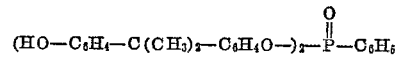

3. A compound having the formula

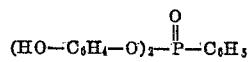

4. A compound having the formula

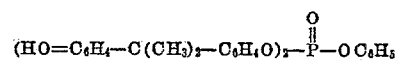

5. A compound having the formula

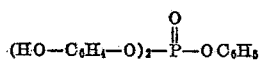

References Cited in the file of this patent

UNITED STATES PATENTS

| | | |
|---|---|---|
| 1,870,972 | Theumann | Aug. 9, 1932 |
| 2,653,161 | Ballard | Sept. 22, 1953 |
| 2,683,168 | Jensen et al. | July 6, 1954 |
| 2,795,609 | Jensen et al. | June 11, 1957 |